Figure 1:
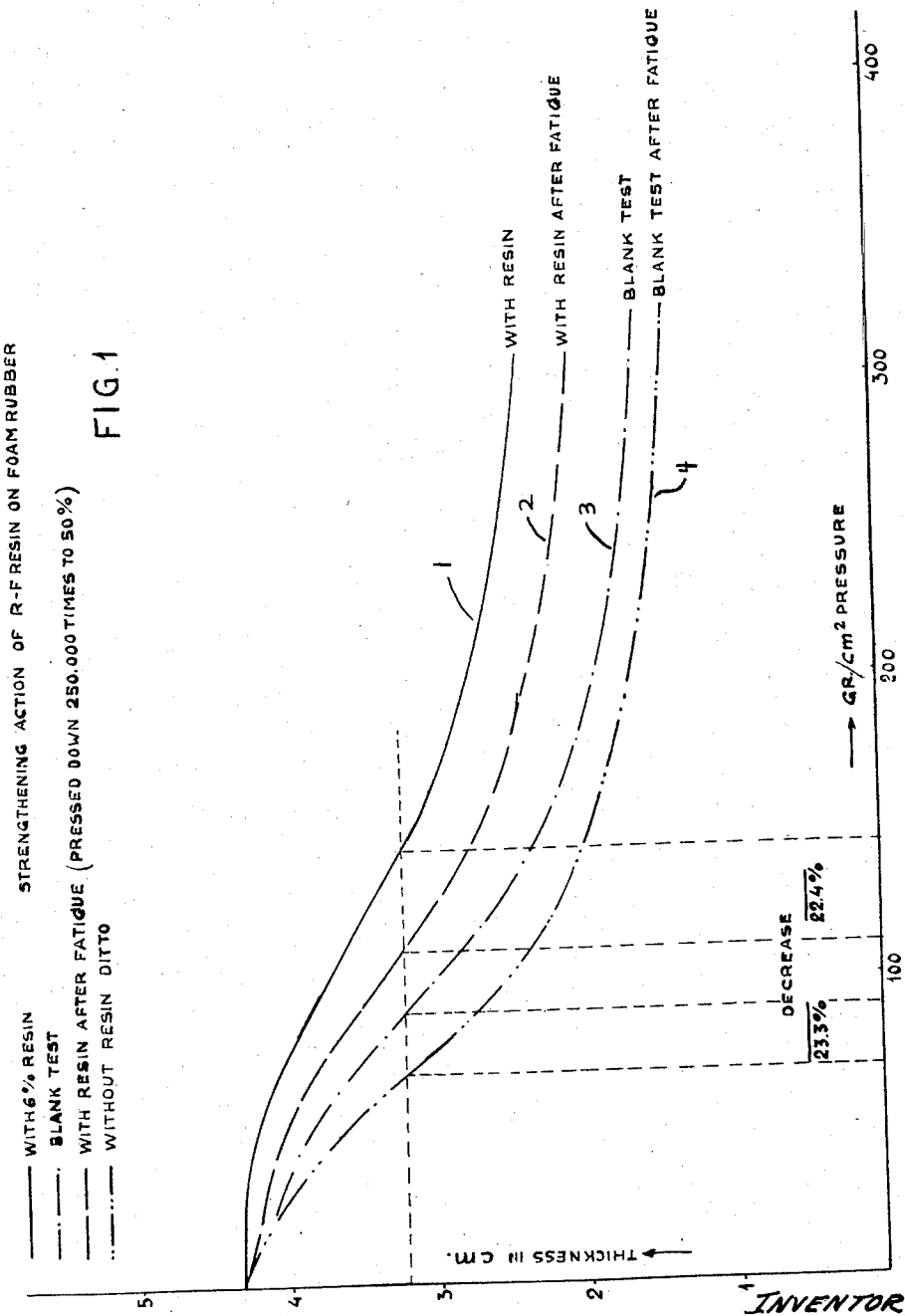

Oct. 14, 1958 G. E. VAN GILS 2,856,316
PROCESS FOR THE MANUFACTURE OF RESIN-REINFORCED
SHAPED RUBBER ARTICLES FROM LATEX
Filed Aug. 13, 1956 2 Sheets-Sheet 1

INVENTOR
GERARD EDUARD VAN GILS
BY Hammond + Littell
ATTORNEYS

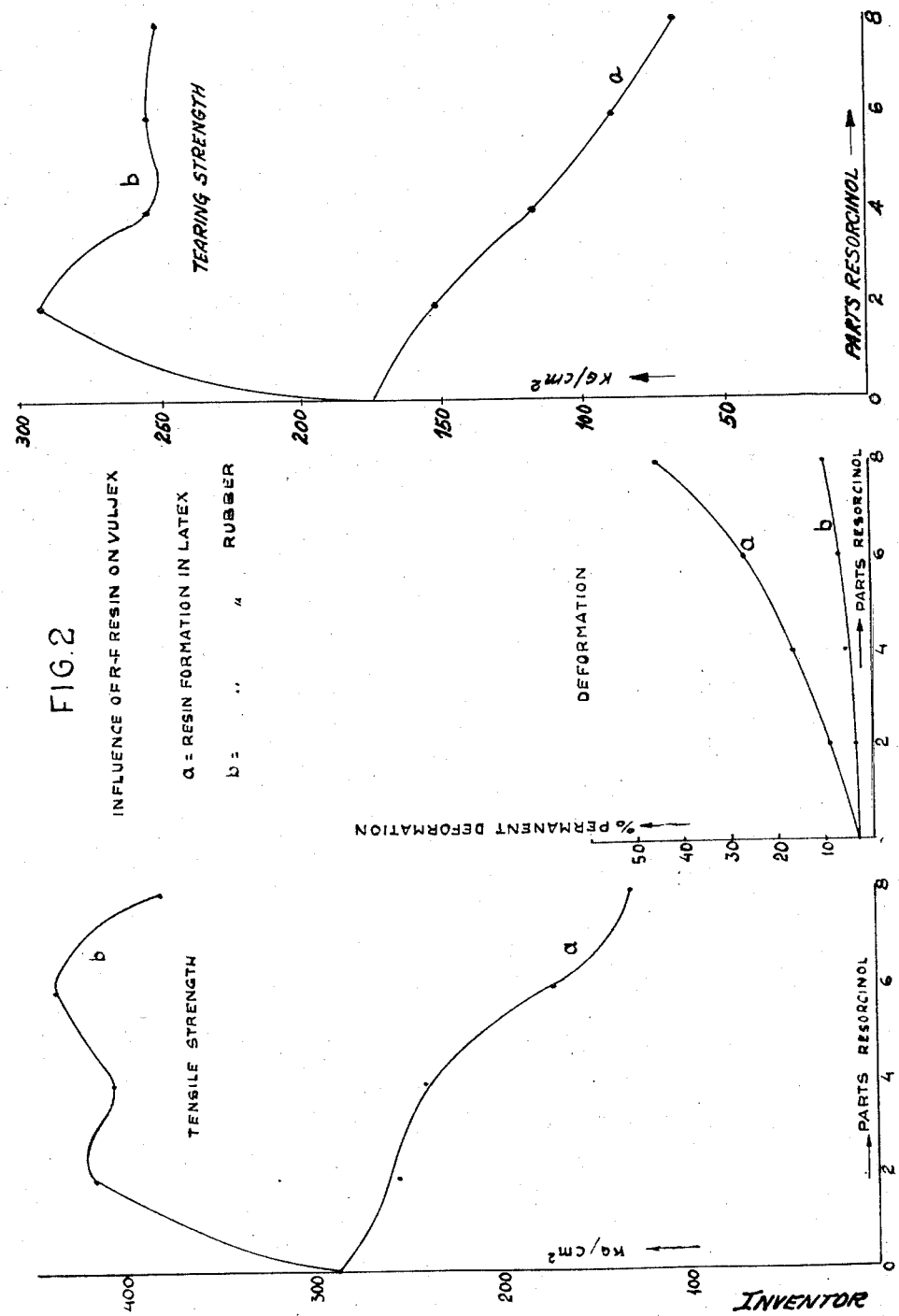

United States Patent Office 2,856,316
Patented Oct. 14, 1958

2,856,316

PROCESS FOR THE MANUFACTURE OF RESIN-REINFORCED SHAPED RUBBER ARTICLES FROM LATEX

Gerard Eduard Van Gils, Cuyahoga Falls, Ohio, assignor to Nederlandse Organisatie Voor Toegepast-Natuurwetenschappelijk Onderzoek t. b. v. Nijverheid, Handel En Verkeer, The Hague, Netherlands, a corporation of the Netherlands Application August 13, 1956, Serial No. 603,542

Claims priority, application Netherlands August 29, 1955

14 Claims. (Cl. 117—98)

Shaped rubber articles can be manufactured as well from dry rubber as from latex. Examples of articles prepared from latex are e. g. sponge rubber, which is prepared by making a foam from latex prior to the gelation or solidification, and rubber gloves prepared by dipping a form in a liquid latex, followed by drying and vulcanizing.

My invention relates to the manufacture of resin reinforced rubber articles prepared from latex. The latex may be of any type, as e. g. raw latex as obtained in the plantations, concentrated latex, synthetic latex, partly vulcanized latex or latex mixed with the vulcanizing agents.

In the French patent specification 972,806 a process is described for producing resin-reinforced rubber, in which the formation of the resin occurs simultaneously with the gelling of the latex. In this process a homogeneous, transparent product is obtained which can be worked afterwards as dry rubber. A process of this type cannot be used to produce products such as sponge rubber directly from latex.

The process of my invention comprises, however, the manufacture of resin-reinforced shaped rubber articles by first forming the article from latex followed by formation of the resin in the formed article, whereby the vulcanization may be carried out before, during or after the resin formation.

The process of my invention may be practiced in various ways. A preferred process is to manufacture formed articles from latex, and to bring these articles into contact with and to introduce therein a compound or a plurality of compounds, which can be converted into a resin in the article, followed by a resinification treatment of the article.

It is, however, also possible to add to the latex a compound or a mixture of compounds which do not resinify in the latex, but which compounds after an article has been formed from the latex, can be reacted to form a resin in the said article or product by a resinification treatment.

My invention will be better understood from the following examples which, however, are not intended to limit the scope of the invention.

EXAMPLE I

Formation of a formed article from Hevea latex, followed by the introduction of a resinifiable compound therein.

A foam rubber cushion was prepared in the well known way by producing a foam from a vulcanizable latex followed by solidifying or gelling and vulcanizing the foam in the form of a cushion. This cushion was soaked with a 10% solution of resorcinol in 0.1 N NaOH, the excess of the solution was removed by centrifuging or squeezing, and the cushion was dried. After drying, the cushion was dipped in an aqueous solution containing 40% formaldehyde, which formed a resorcinol-formaldehyde resin with the resorcinol which remained in the cushion after the first dipping process. The excess of the formaldehyde solution was removed and then the cushion was dried. The mechanical properties of such a cushion are described hereinafter in Table I and in the description of the drawings.

It is not essential in the process of my invention to use a rapid-hardening resin such as a resorcinol-formaldehyde resin. Normal commercial resins, such as phenol-formaldehyde, cresol-formaldehyde and other alkyl-phenol formaldehyde resins, as well as urea-formaldehyde, and resins based on melamine, guanidine or the like with formaldehyde can be used with the same result.

EXAMPLE II 1 gram molecule of phenol was dissolved in 47 ml. 1 N NaOH and 1.2 gram molecule of formaldehyde in the form of a 40% aqueous solution. This solution was heated to 90° C. for 20 minutes. In the heating process a solution of a pre-polymerized low molecular weight compound is formed, which is probably mainly a phenol-methylol compound and which can be converted to a high molecular weight insoluble resin by a heating process.

A foam rubber cushion was soaked with such a solution of a low molecular weight phenol-formaldehyde compound, and after removal of the excess of the solution, heated at 100° C. for about 15 minutes. It appeared that 9% by weight of the resin had been introduced into the rubber. The properties of the cushion thus prepared are described hereinafter in Table II.

If, as in this example, a pre-polymerized compound is used in the treatment of the rubber, this must be a low molecular weight compound because the ultimate resinification must take place in the rubber article and not before introduction into the rubber article, to obtain the desired properties. Preferably the foam rubber article should be treated with the low molecular weight methylol compound while still wet. This is not only simpler, but surprisingly this causes an increase in volume and a lower specific gravity in the object as compared to an object which is treated after drying.

Products produced according to my process may have a specific gravity considerably less than that of normal foam rubber products and still have the same stiffness as the normal foam rubber products. For example, the stiffness of a foam rubber product with a specific gravity of 0.06, produced according to my invention, is about the same as that of an untreated foam rubber product with a specific gravity of 0.095. The resulting savings in rubber or latex cost is substantial.

A process is described in the "Revue Générale du Caoutchouc," 28, 487–491 and 570–576 (1956) and in "Ind. Eng. Chemistry," 43, 381–386 (1951) wherein a pre-polymerized high molecular weight and partly resinified resorcinol-formaldehyde resin is added to latex, followed by forming an article from this mixture. This article is heated afterwards for vulcanization of the latex and further resinification of the resin. In this process the resinification is substantially completed before introducing the resin into the latex, and it appeared that the improvement of the mechanical properties obtained in this process is only temporary and is not maintained even after only a single deformation.

When easily cured resins such as resorcinol-formaldehyde resins are used in my process, it is essential that no resinification take place prior to the shaping of the article. This requirement can easily be fulfilled, either by treatment of the object produced from the latex as described in Example I, or by addition to the latex of only one of the resin-forming compounds, e. g. resorcinol, followed by treatment of the object formed from this latex with the other resin-forming compound, e. g. formaldehyde.

To show the properties of the products prepared by the process of this invention, the following testing methods were used:

Hardness, tensile strength and permanent set were determined by the method described in Netherlands Standard Leaflet (Nederlands Normblad) N 1001—issued by the Nederlandse Normalisatie Commissie.

Tear-resistance was determined by the method described in the Proceedings of the second Rubber Technology Conference, 1948, page 256.

Stiffness was determined by the force in g./cm.$^2$ which is necessary to compress the object to 75% of its original thickness.

Stiffness after a fatigue test was determined by first compressing the product to 50% of its original thickness 250,000 times and measuring the stiffness thereafter.

In the following Table I the foam rubber cushion prepared according to Example I is compared with a similar cushion prepared from the same latex foam without treatment with the resinifying compounds.

Table I

|  | Original stiffness | Stiffness After Wear |
|---|---|---|
| Treated cushion in Example I | 143 | 111 |
| Untreated cushion | 96 | 73 |

In Table II the stiffness of a foam rubber cushion prepared according to the treatment of Example II is compared with the stiffness of an identical cushion without the treatment of Example II.

Table II

|  | Specific Gravity | Stiffness | Stiffness After Wear |
|---|---|---|---|
| Treated cushion | 0.142 | 100 | 89 |
| Untreated cushion | 0.131 | 58 | 47 |

In the accompanying drawings, Fig. 1 shows a graph indicating the stiffening effect of the treatment as described in Example I.

Fig. 2 shows three graphs indicating the tensile strength, the permanent set and the tear-resistance of rubber sheets containing varying amounts of resin formed respectively before and after forming of the sheets.

In Fig. 1 the vertical scale indicates the thickness in centimeters of a foam rubber cushion being tested and the horizontal scale indicates the pressure in grams per square centimeter applied to the cushion being tested. Line 1 indicates the decrease in thickness with the application of pressure of a foam rubber cushion as prepared according to the process of Example I. Line 2 indicates the decrease in thickness of a similar treated cushion after a fatigue test (250,000 compressions to 50% of its original thickness). Line 3 indicates the corresponding decrease in thickness for an untreated cushion under the same test and line 4 indicates the decrease in thickness of an untreated cushion after a fatigue test (250,000 compressions to 50% of its original thickness).

EXAMPLE III

Fig. 2 shows the tensile strength, the permanent set and the tear resistance of a rubber object or sheet in which according to the invention the resin is formed in the preformed rubber object (lines b) an in the latex before forming the object (lines a).

In Fig. 2, part A, the vertical scale indicates the tensile strength in kilograms per square centimeter of the tested sheets and the horizontal scale the parts of resorcinol used in the production of the sheets. In part B the vertical scale indicates the percent of permanent set of the sheets and in part C the tear resistance of the sheets is shown with reference to coordinates which are the same as for part A. Line $a$ shows the tensile strength, percent permanent set and tear resistance of a sheet formed by adding the resin to the latex before formation of the sheet and line $b$ shows the same characteristics for a sheet which has been preformed and the resin introduced into and cured in the preformed sheet.

The vulcanized latex used for making the objects tested as indicated according to the graphs of Fig. 2 is available under the trademark "Vuljex." This latex can be easily mixed with resorcinol by the addition of a small quantity of sodium hydroxide as stabilizer.

The product which on testing gave the results shown in lines $a$ of the graphs was prepared by first adding resorcinol dissolved in sodium hydroxide to the "Vuljex," followed by addition of formaldehyde. Under these conditions part of the formaldehyde reacts with the ammonia which is present in the latex, and the remainder reacts with the resorcinol with formation of a resin in the latex prior to the formation of an article or product therefrom. The liquid mixture thus produced was poured on glass-plates and dried to sheets.

The product which on testing gave the results shown in the graphs $b$ was prepared by making sheets from a latex-resorcinol mixture containing resorcinol in various proportions as indicated by pouring this mixture on glass plates and treating the sheets so formed after drying with formaldehyde. In these sheets, therefore the resin was formed after the formation of the sheet or object according to my invention. Objects containing increasing quantities of resin were made as indicated.

PRODUCT a

| No. of test | 1 | 2 | 3 | 4 | 5 |
|---|---|---|---|---|---|
| g. "Vuljex" 60% | 100 | 100 | 100 | 100 | 100 |
| cm.$^3$ NaOH 1 N | | 30 | 35 | 40 | 40 |
| cm.$^3$ resorcinol 50% | | 2.4 | 4.8 | 7.2 | 9.6 |
| cm.$^3$ formaldehyde 40% | | 4.6 | 5.7 | 6.8 | 7.9 |

PRODUCT b

| No. of test | 1 | 2 | 3 | 4 | 5 |
|---|---|---|---|---|---|
| g. "Vuljex" 60% | 100 | 100 | 100 | 100 | 100 |
| cm.$^3$ NaOH 1 N | | 30 | 35 | 40 | 40 |
| cm.$^3$ resorcinol | | 2.4 | 4.8 | 7.2 | 9.6 |

In product $a$, as well as in product $b$, the resorcinol was dissolved in the sodium hydroxide solution and then added to the "Vuljex." Also, the resorcinol solution contained 10% of the quantity of resorcinol of an emulsifier obtainable under the trademark "Darvan." Calculated quantities of resorcinol were used in order to yield products containing 0, 2, 4, 6 and 8 g. of resorcinol per 100 g. rubber, respectively.

From the graphs of Fig. 2 it is clear that the products according to graphs $b$ are much better than the products produced according to the process which yielded the product according to graphs $a$.

EXAMPLE IV.—NON-PREVULCANIZED LATEX

This example illustrates the reinforcing action of resorcinol-formaldehyde resin which, according to the invention, is formed in the rubber phase of articles, directly formed from latex to which vulcanization agents have been added.

A usual commercial ammoniated latex 60% was used; it was blended with a solution of resorcinol and a dispersion of vulcanization agents so that per 100 parts by weight of rubber, 2 parts by weight of sulfur, 1 part by weight of zinc diethyl dithiocarbamate and 2 parts by weight of zinc oxide were present. Films of this mixture were cast on a glass plate, which films, after drying, were immersed in formalin for 24 hours; during these 24 hours the resorcinol-formaldehyde resin was formed in the rubber. After drying, the films or foils thus obtained were vulcanized in an ordinary vulcanization oven at 100° C. for 1 hour. From the article thus obtained the tensile strength, the elongation at rupture and the modulus at 600% elongation were determined and these values were compared with those obtained with an untreated foil not containing resin. The results are found in the table below:

| Test No | 1 | 2 |
|---|---|---|
| Latex 60% | 100 | 100 |
| Vulcanization dispersion 50% | 7.5 | 7.5 |
| cm.³ resorcinol 50%, dissolved in 1 normal NaOH | 7.2 | |
| Tensile strength, kg./cm.² | 353 | 318 |
| elongation at rupture | 800 | 800 |
| Stiffness 600%, kg./cm.² | 148 | 78 |

The process of my invention can be used with natural latex, but is especially advantageous if synthetic latex is used, which normally provides products of poorer quality than natural latex. If, however, the process of my invention is used with synthetic latex, the articles obtained have properties competing with the properties of articles of natural latex made in the usual way.

The resinification of the compounds in the formed rubber products can be performed according to any known method, as e. g. heating. If vulcanizing agents have been added to the latex, vulcanization and resinification can be performed by a single heating step after forming the objects to the shape desired.

While the process of my invention may be used with rubber products of various shapes and characteristics it is particularly advantageous in foam rubber products, as it permits foam rubber pillows, cushions, mattresses, upholstery forms and the like to be produced with a lesser quantity of latex and still have the same or greater stiffness and fatigue resistance characteristics as similar foam rubber products produced from a greater quantity of latex without the resin reinforcement of my invention.

While I have described preferred embodiments and applications of my invention it will be understood that various modifications and changes in the embodiments and compositions given may be made within the spirit of my invention and the scope of the following claims.

I claim:

1. As a product of manufacture a non-masticated preformed rubber object formed from latex selected from the group consisting of natural latex and synthetic latex, containing therein, and uniformly distributed therethrough one element of a resin-forming coupling selected from the group consisting of resorcinol, phenol, cresol, alkylphenol, urea, melamine and guanidine, and having a second lower alkanol element of a resin-forming coupling added thereto and resinified with said first resin forming coupling.

2. As a product of manufacture a foam rubber product having interconnected rubber lattices therein as in normal foam rubber products and having a resinified compound selected from the group consisting of resorcinol-formaldehyde, phenol-formaldehyde, cresol-formaldehyde, alkylphenol-formaldehyde, urea-formaldehyde, melamine-formaldehyde and guanidine-formaldehyde resins, dispersed through and on said lattices.

3. The method of increasing the stiffness of a foam rubber article formed from latex selected from the group consisting of natural latex and synthetic latex which comprises introducing into said preformed foam rubber article the components of heat-curable resin and curing said resin in situ within the structure of said foam rubber article.

4. The method of increasing the stiffness and reducing the weight of a foam rubber product formed from latex selected from the group consisting of natural latex and synthetic latex which comprises forming said product to the desired shape and size, introducing into said formed foam rubber product resin-forming compounds in solution, removing the excess solution and resinifying said resin-forming compounds in situ within the structure of said foam rubber product.

5. Process according to claim 12, in which at least one of the resin-forming components is added in aqueous solution to said latex and after forming said object the other resin-forming components are added and said object is heated to effect resinification.

6. Process for the manufacture of non-masticated resin-reinforced rubber objects comprising mixing latex selected from the group consisting of natural latex and synthetic latex with an aqueous solution of resorcinol, forming an object of this mixture, and treating this object with formaldehyde to undergo formation of a resorcinol-formaldehyde resin in the formed object.

7. Process for the manufacture of shaped resin-reinforced foam rubber objects, comprising adding to the interstices of said shaped foam rubber object a pre-polymerized soluble low molecular and unresinified methylol compound prepared from formaldehyde and a compound of the group consisting of phenol, cresol, urea, melamine and guanidine, and heating said object to resinify said low molecular compound within the structure of said object.

8. Process for the manufacture of resin-reinforced rubber objects from a latex of synthetic rubber comprising first forming an object from the latex followed by forming a resin selected from the group consisting of resorcinol-formaldehyde, phenol-formaldehyde, cresol-formaldehyde, alkylphenol-formaldehyde, urea-formaldehyde, melamine-formaldehyde, and guanidine-formaldehyde resins within the structure of said rubber object.

9. Process for the manufacture of resin-reinforced rubber objects from a latex containing vulcanizing agents comprising first forming an object from the latex followed by forming a resin selected from the group consisting of resorcinol-formaldehyde, phenol-formaldehyde, cresol-formaldehyde, alkylphenol-formaldehyde, urea-formaldehyde, melamine-formaldehyde, and guanidine-formaldehyde resins within the structure of said rubber object.

10. As a product of manufacture a non-masticated resin-reinforced rubber object formed from latex selected from the group consisting of natural latex and synthetic latex, said rubber object having a preformed rubber structure and a reinforcement of a resin selected from the group consisting of resorcinol-formaldehyde resin, phenol-formaldehyde resin, cresol-formaldehyde resin, alkyl phenol-formaldehyde resin, urea-formaldehyde resin, melamine-formaldehyde resin and guanidine-formaldehyde resin, said resin being formed in situ within the structure of said preformed rubber structure.

11. As a product of manufacture a foam rubber product having interconnected rubber lattices therein as in normal foam rubber products and having a resinified resorcinol-formaldehyde resin dispersed through and on said lattices.

12. The process for the manufacture of non-masticated resin-reinforced rubber objects comprising first forming an object from a latex selected from the group consisting of natural latex and synthetic latex and after formation of said rubber object effecting formation within the formed rubber structure of a reinforcing resin selected from the group consisting of resorcinol-formaldehyde, phenol-formaldehyde, cresol-formaldehyde, alkylphenol-formaldehyde, urea-formaldehyde, melamine-formaldehyde and guanidine-formaldehyde resins.

13. Process according to claim 12 in which at least one of the resin-forming components is added in an aqueous solution to the formed foam rubber object, and then the other resin-forming components are added thereto and said object is heated to effect resinification.

14. Process according to claim 12 in which said rubber object and the resin-forming components are added to the formed rubber object as soluble unresinified low molecular compounds and said object is heated to effect resinification.

References Cited in the file of this patent

UNITED STATES PATENTS

| | | |
|---|---|---|
| 2,257,911 | Kraft | Oct. 7, 1941 |
| 2,602,193 | Korkatti | July 8, 1952 |
| 2,711,969 | Abig | June 28, 1955 |
| 2,711,977 | Butsch | June 28, 1955 |

FOREIGN PATENTS

| | | |
|---|---|---|
| 972,806 | France | Feb. 5, 1951 |
| 578,404 | Great Britain | June 27, 1946 |

OTHER REFERENCES

Ind. and Eng. Chem., vol. 43, January-April 1951, "Direct Reinforcement of Natural Latex Mixes," Le Bras et al., pp. 381-386.

UNITED STATES PATENT OFFICE
CERTIFICATE OF CORRECTION

Patent No. 2,856,316                                      October 14, 1958

Gerard Eduard Van Gils

It is hereby certified that error appears in the printed specification of the above numbered patent requiring correction and that the said Letters Patent should read as corrected below.

Column 2, line 11, after "urea-formaldehyde" strike out the comma; line 13, after "formaldehyde" insert a comma; same column 2, lines 21, 24, 26, 34, 38 and 55, for "molecular weight", each occurrence, read -- molecular-weight --; column 3, line 69, for "an" read -- and --; column 5, line 52, after "through" insert a comma; line 55, for "alkanol" read -- alkanal --.

Signed and sealed this 17th day of November 1959.

(SEAL)
Attest:

KARL H. AXLINE
Attesting Officer

ROBERT C. WATSON
Commissioner of Patents